US009239633B1

(12) United States Patent
Loo et al.

(10) Patent No.: US 9,239,633 B1
(45) Date of Patent: Jan. 19, 2016

(54) SYSTEM AND METHOD FOR DEVICE HAVING INTERNAL RESET/RESTART BUTTON THAT IS ACTIVATED VIA INSERTION TOOL ACCESSIABLE THROUGHT SINGLE TRANSMISSION PATH OF PLUG CONNECTION

(75) Inventors: Kenneth Ryan Loo, San Jose, CA (US); Leng Ooi, San Jose, CA (US)

(73) Assignee: Google Inc., Mountain View, CA (US)

( * ) Notice: Subject to any disclaimer, the term of this patent is extended or adjusted under 35 U.S.C. 154(b) by 313 days.

(21) Appl. No.: 13/606,744

(22) Filed: Sep. 7, 2012

(51) Int. Cl.
*G06F 3/033* (2013.01)
*G06F 1/16* (2006.01)

(52) U.S. Cl.
CPC .............. *G06F 3/033* (2013.01); *G06F 1/1626* (2013.01)

(58) Field of Classification Search
CPC  G06F 2200/1626; G06F 3/033; G06F 1/1626
USPC ............... 710/62, 63, 72–74; 200/50.09, 296; 345/179
See application file for complete search history.

(56) References Cited

U.S. PATENT DOCUMENTS

| | | | |
|---|---|---|---|
| 4,384,183 A | | 5/1983 | Meshoulam |
| 4,394,644 A | | 7/1983 | Di Leo et al. |
| 4,593,162 A | * | 6/1986 | Rochette ..................... 200/51.09 |
| 5,750,939 A | * | 5/1998 | Makinwa ................ G06F 3/046 178/18.01 |
| 5,842,045 A | * | 11/1998 | Nakamura ....................... 710/63 |
| 6,233,464 B1 | * | 5/2001 | Chmaytelli ............ G06F 1/1616 345/179 |
| 6,321,278 B1 | | 11/2001 | Phu et al. |
| 6,845,408 B1 | * | 1/2005 | Lemke et al. ..................... 710/18 |
| 6,890,197 B2 | * | 5/2005 | Liebenow ..................... 439/188 |
| 6,964,586 B2 | | 11/2005 | Siddiqui |
| 6,965,950 B1 | * | 11/2005 | Nagasawa et al. ............... 710/16 |
| 6,992,257 B2 | | 1/2006 | Follingstad et al. |
| 7,241,179 B2 | | 7/2007 | Chennakeshu |
| 7,305,253 B2 | | 12/2007 | Snyder et al. |
| 7,800,360 B2 | * | 9/2010 | Johansson et al. ......... 324/207.25 |
| 7,942,705 B2 | | 5/2011 | Murphy et al. |
| 8,047,878 B2 | | 11/2011 | Szini et al. |
| 8,105,116 B2 | | 1/2012 | Caveney et al. |
| 8,299,379 B2 | * | 10/2012 | Jiang et al. ..................... 200/296 |
| 8,558,819 B2 | * | 10/2013 | Chen ............................. 345/179 |
| 8,983,087 B2 | * | 3/2015 | You et al. ......................... 381/74 |
| 2002/0039851 A1 | | 4/2002 | Mou et al. |
| 2003/0009249 A1 | | 1/2003 | Loeb et al. |
| 2004/0204185 A1 | | 10/2004 | Snyder et al. |
| 2007/0124571 A1 | | 5/2007 | Alperin et al. |
| 2007/0218774 A1 | | 9/2007 | Han et al. |
| 2008/0247592 A1 | * | 10/2008 | Kourzanov ................... 381/384 |
| 2009/0180642 A1 | | 7/2009 | Sander et al. |
| 2010/0130043 A1 | | 5/2010 | Wang et al. |

(Continued)

*Primary Examiner* — Tammara Peyton

(74) *Attorney, Agent, or Firm* — Lerner, David, Littenberg, Krumholz & Mentlik, LLP

(57) ABSTRACT

An integrated port for connecting a device with an accessory having a plug is provided. An opening in the device may provide access to a recess of the port for receiving one or more connectors of the plug. The recess may include one or more terminals for electrically coupling with one or more connectors of the plug in a first mode of operation. The recess may also include a switch, which may be activated to change the operational state of the device from the first mode of operation into a second mode of operation that is not intended for general use. The switch may be provided such that insertion of the plug into the recess via the opening electrically couples the one or more terminals of the port with the one or more connectors of the plug without activating the switch.

20 Claims, 5 Drawing Sheets

(56) References Cited

U.S. PATENT DOCUMENTS

| | | |
|---|---|---|
| 2010/0215183 A1 | 8/2010 | Hansson et al. |
| 2010/0216526 A1 | 8/2010 | Chen et al. |
| 2011/0099300 A1 | 4/2011 | Siulinski |
| 2011/0103608 A1 | 5/2011 | Wu et al. |
| 2011/0150234 A1 | 6/2011 | Johnson et al. |
| 2011/0183536 A1 | 7/2011 | Wang |

* cited by examiner

SYSTEM AND METHOD FOR DEVICE HAVING INTERNAL RESET/RESTART BUTTON THAT IS ACTIVATED VIA INSERTION TOOL ACCESSIABLE THROUGHT SINGLE TRANSMISSION PATH OF PLUG CONNECTION

BACKGROUND

Modern electronic devices such as PCs, laptops, smartphones, tablets, and TVs include a number of openings forming ports for interfacing with the device. For example, many devices include openings forming headphone and/or microphone ports, universal serial bus (USB) ports, charger ports, network connection ports, telephone connection ports, reset ports, etc. The number, location, size, and ease of use of the openings provided on the exterior of the device are important aesthetic considerations in the overall form factor of the devices. As a result, companies devote a considerable amount of resources and expenses to design products that not only include desired functionality, but are also aesthetically pleasing to consumers.

SUMMARY

Some of the ports provided on electronic devices are not intended for general use by consumers. For example, some devices include a hidden switch or data port on the device which can be activated to put the device into a test, developer, or unlocked mode. The openings forming such ports are typically concealed in locations that cannot be seen or accessed without removing a portion of the body of the device. However, this can make the device harder to design, more expensive to manufacture, and more inconvenient to use when a need to access such special functionality arises.

In various aspects an integrated port for connecting a device with an accessory having a plug is provided. An opening in the device may provide access to a recess of the port for receiving one or more connectors of the plug. The recess may include one or more terminals for electrically coupling with one or more connectors of the plug. The recess may also include a switch, which may be activated to change the operational state of the device into a special test or developer mode that is not intended for general use. The switch may be provided such that insertion of the plug into the recess via the opening electrically couples the one or more terminals of the port with the one or more connectors of the plug without activating the switch.

Accordingly, in one aspect a port for operating an electronic user device in one or more selected modes of operation is provided. The port may include a body which defines an opening for receiving a plug in a recess of the body of the port. One or more terminals may be exposed in the recess for electrically coupling with one or more connectors of the plug to operate the user device in a first mode of operation. The port may also include a switch disposed in the recess remote from the opening, such that activation of the switch causes the user device to operate in a second mode of operation. The port may be configured such that insertion of the plug into the recess via the opening electrically couples the one or more terminals of the port with the one or more connectors of the plug without activating the switch.

In another aspect, a device including a memory, a processor, and a communication port is provided. The memory may store instructions and data, and the processor may be configured to execute the instructions and to process the data to operate the device in one or more selected modes of operation. The communication port may define an opening that provides access to a recess in the communication port for receiving one or more connectors of a plug of an accessory of the device. The communication port may also include one or more terminals, which, when electrically coupled with the one or more connectors of the plug, may configure the device to operate in a first mode of operation. The communication port may further include a switch disposed in the recess, where activation of the switch may configure the device to operate in a second mode of operation. The communication port may be further configured such that insertion of the plug of the accessory into the recess of the communication port electrically couples the one or more terminals of the port with the one or more connectors of the plug for communication between the device and the accessory without activating the switch.

In yet another aspect, a method for operating a device in one or more selected modes of operation is provided. The method may include providing a port having an opening for receiving one or more connectors of a plug into a recess within the port. The method may also include exposing one or more terminals in the recess for electrically coupling with the one or more connectors of the plug in a first mode of operation. The method may further include disposing a switch in the recess remote from the opening, such that activation of the switch causes the user device to operate in a second mode of operation, and, such that insertion of the plug into the recess via the opening electrically couples the one or more terminals of the port with the one or more connectors of the plug without activating the switch.

DETAILED DESCRIPTION

The aspects, features and advantages of the present disclosure will be appreciated when considered with reference to the following description of example embodiments and accompanying figures. The same reference numbers in different drawings may identify the same or similar elements. Furthermore, the following description does not limit the present disclosure; rather, the scope of the disclosure is defined by the appended claims and equivalents.

Figure 1:
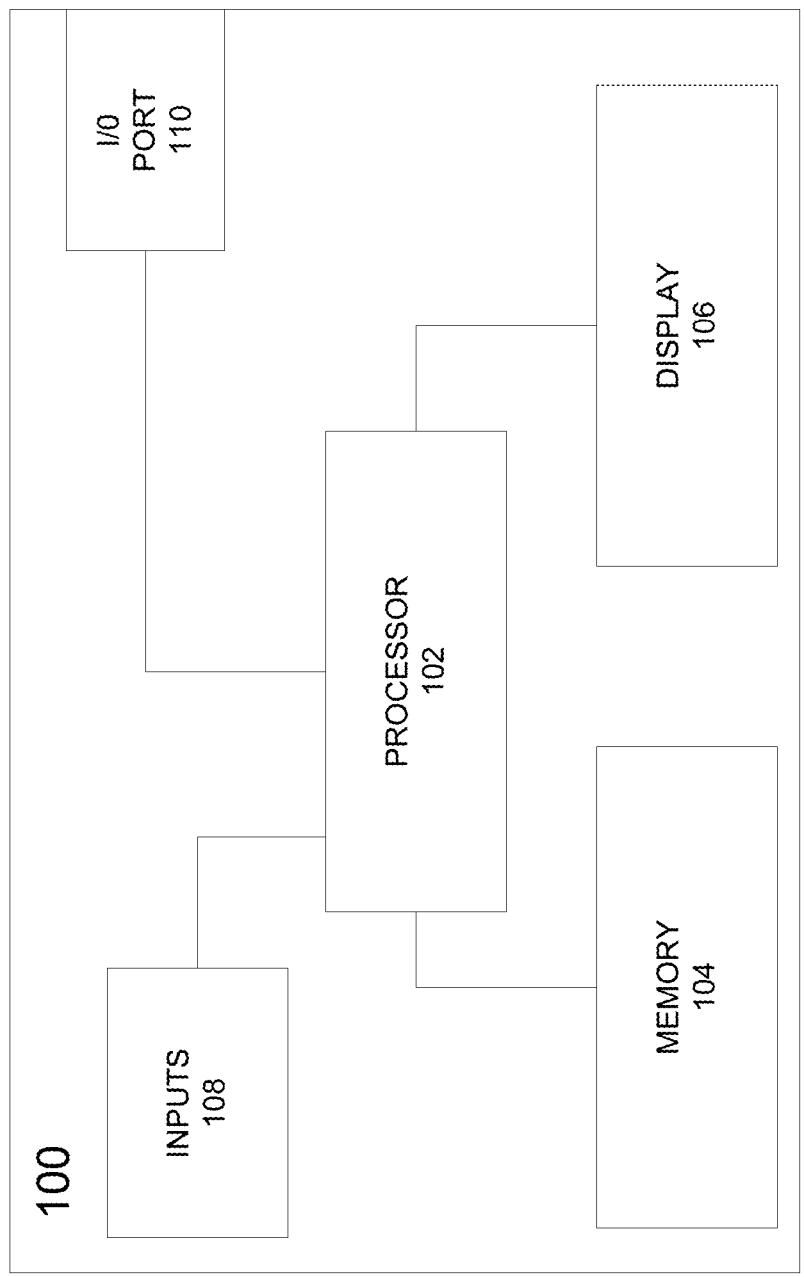
FIG. 1 illustrates an electronic device including an integrated port in accordance with various aspects of the disclosure.

FIG. 1 provides a functional view of an electronics device 100 in accordance with various aspects of the disclosure. Examples of device 100 include cameras, TVs, smartphones, PDAs, tablets, laptops, PCs, set-top boxes, receivers, gaming devices, etc. In one aspect, the device 100 can be at one node of a network and capable of wired or wireless communication with other nodes of the network such as base stations or servers. The device 100 may use various protocols to communicate with cellular networks such as 3GPP Long Term Evolution (LTE), other wireless networks such as WiFi, the Internet, intranets, virtual private networks, local Ethernet networks, private networks using communication protocols proprietary to one or more companies, instant messaging, HTTP and SMTP, and various combinations of the foregoing.

As shown in FIG. 1, the device 100 may include a processor 102 that is communicatively coupled with a memory 104, a display 106, user inputs 108. The processor may also be communicatively coupled with an integrated port 110, described later, for interconnecting the device 100 with an external accessory.

The processor 102 can be any conventional processor. Alternatively, the processor can be a dedicated device such as an ASIC. Although FIG. 1 functionally illustrates the processor, memory, and other elements as being within the same block, the processor 102 and memory 104 can actually include multiple processors and memories that may or may not be stored within the same physical housing. For example, rather than being stored in the same device, processor 102 and memory 104 can be stored in separate devices. Accordingly, although references to a processor or memory herein assume that the processor and memory are stored internally within device 100, such references include references to a collection of processors or memories that may or may not operate in parallel and may or may not be located a single housing.

In one aspect, device 100 stores information in memory 104 accessible by processor 102, including instructions and data that are executed or otherwise used by the processor. The memory 104 can be of any type capable of storing information accessible by the processor, including a computer-readable medium or other medium that stores data that can be read with the aid of an electronic device, such as ROM, RAM, a magnetic or solid-state based hard-drive, a memory card, a DVD or other optical disks, as well as other volatile and non-volatile write-capable and read-only memories. The device 100 can include different combinations of the foregoing, and different portions of the instructions and data may be stored on different types of media.

The instructions can be any set of instructions to be executed directly such as object code or indirectly such as scripts or collections of independent source code modules interpreted on demand by the processor. For example, the instructions can be stored as computer code on a computer-readable medium. In that regard, the terms "instructions," "programs" and "applications" may be used interchangeably herein.

Data may retrieved, stored or modified by processor 102 in accordance with the instructions. For instance, while the data is not limited to any particular data structure, the data can be stored in computer registers, in a relational database as a table having multiple different fields and records, XML documents or flat files. The data can also be formatted in any computer-readable format. By further way of example only, data may include audio data, video data, user data, program data, etc. The data can include any information sufficient to identify the relevant information, such as numbers, descriptive text, proprietary codes, references to data stored in other areas of the same memory or different memories including other network locations, or information that is used by a function to calculate the relevant data.

The display 106 can be a small LCD touch-screen or any other display device that is operable to display textual or graphic information to a user. The user inputs 108 may include one or more buttons, a mouse, a keyboard, etc for receiving inputs from a user.

As referenced above, in various aspects the device 100 may include an opening forming the integrated port 110 that includes connections for interconnecting the device 100 to an external accessory. In a particular aspect, a mechanism such as a switch for activating a special function of the device may be integrated into the integrated port 110 without requiring any separate openings in the device.

Figure 2:
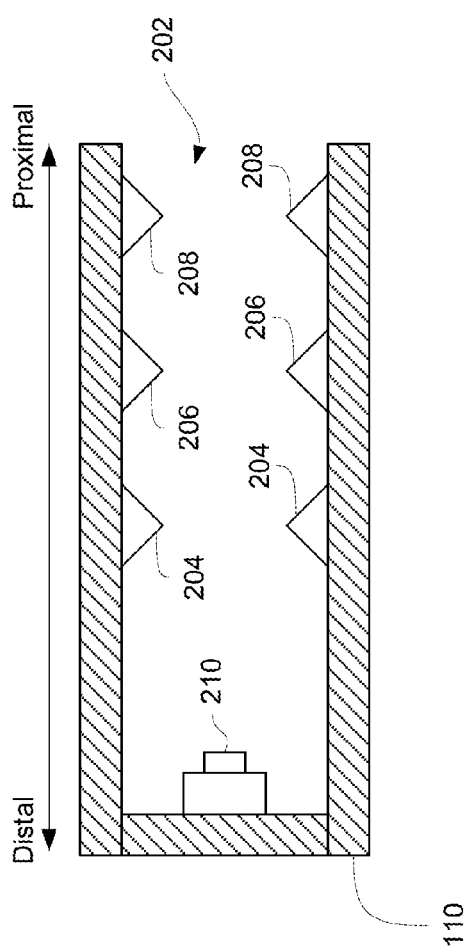
FIG. 2 illustrates a functional view of an port that integrates a special function switch and an audio jack in accordance with one aspect of the disclosure.

FIG. 2 illustrates a functional view of the integrated port 110. As seen in FIG. 2, a recess 202 forming the integrated port 110 may include one or more terminals 204, 206, and 208 that may be located proximally in an axial direction to an opening of the recess 202. The terminals may be configured to electrically couple with and retain a connector or plug of an external accessory device such as a cylindrical plug of a headphone.

As shown, the recess 202 forming the integrated port 110 also includes a switch 210 that may be located distally in an axial direction from the opening exposing the recess on the surface of device. The switch 210, when activated by, for example, mechanical pressure applied to the switch, may generate a software or hardware interrupt which configures the processor 102 of the device 100 to execute a special program or routine in the memory 104. The activation of the switch 210 integrated into the port 110 may thus temporarily modify the operation of the device 100 until the switch is activated again or until the device power is recycled. For example, the state of the device may change into a developer or test state, not intended for general use by a consumer, which allows an operator access to and/or causes the processor to execute and process restricted routines and data in the device that are not intended to be available during general use. Once the device 100 has been switched into a special operational state, an operator may interact with the device in that operational state using the display 106 and the inputs 108. In other aspects, the activation of the switch 210 may result in a state that does not require any operator further interaction, such as performing a hard reset of the device into a factory default state.

Figure 3:
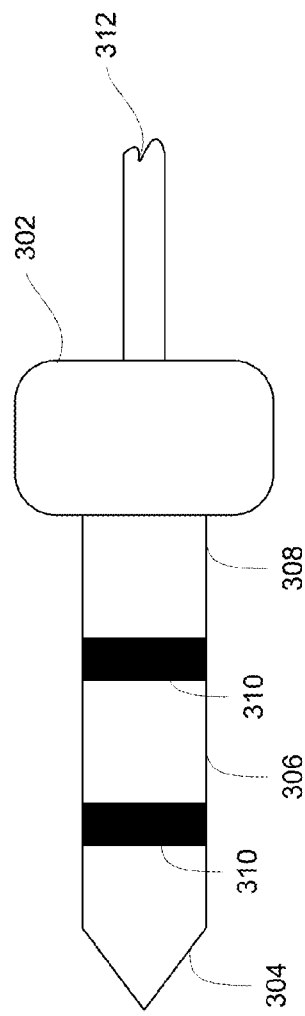
FIG. 3 illustrates an example of an audio plug for connecting with the audio jack of the integrated port illustrated in FIG. 2.

FIG. 3 illustrates an example of a three-connector headphone plug 302 which may be inserted into the recess 202. Upon insertion of the plug 302 into the port, the terminals 204, 206, and 208 may respectively couple with a tip connector 304, a ring connector 306 and a sleeve connector 308 provided on the plug 302. The tip connector 304 and the ring connector 306 may also be connected with, for example, a left speaker and a right speaker of the headphone. The sleeve connector 308 may be used as a ground connection. While three connections are shown, other examples may include 1, 2, or 4 or more connectors (e.g., for an RJ-11 or RJ-45 plug).

Figure 4:
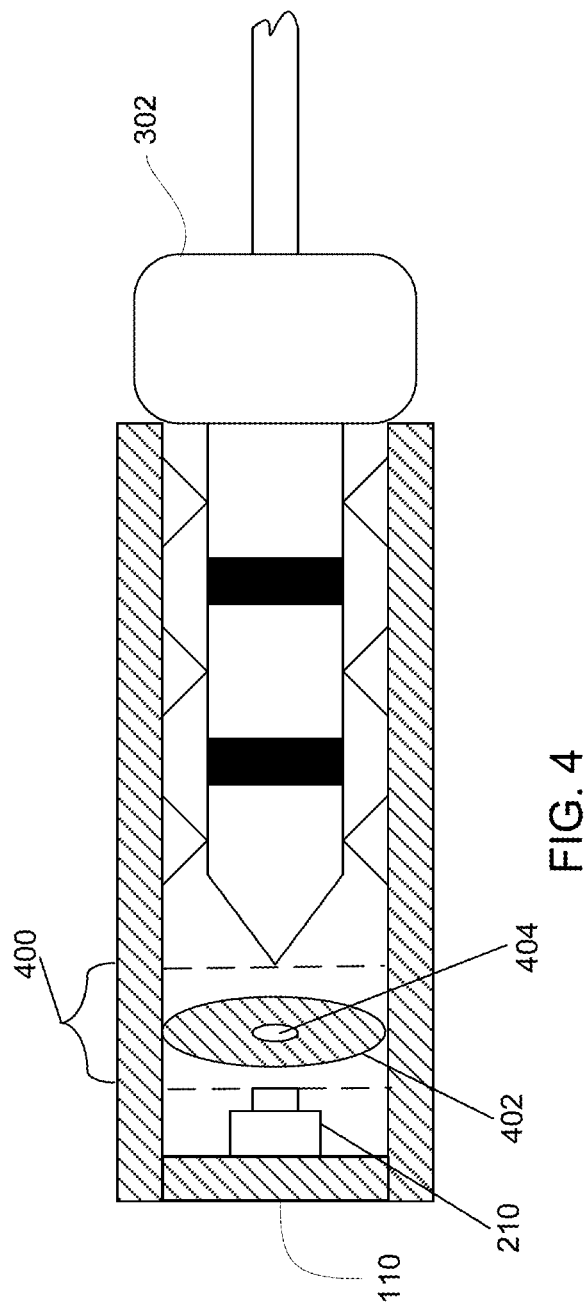
FIG. 4 depicts a functional view of the integrated port when the audio plug is inserted into the audio jack in accordance with an aspect of the disclosure.

FIG. 4 shows a view after the insertion of the plug 302 into recess 202 of the integrated port 110. As shown, terminals 204, 206, and 208 of the integrated port 110 may each electrically couple with corresponding connectors 304, 306 and 308 of the plug respectively. Furthermore, the connectors of the plug 302 and the switch 210 may be separated by a gap 400 in the recess 202, such that switch 210 is not activated when the plug 302 is fully inserted into the integrated port and the connectors of the plug engage with the terminals of the integrated port.

In one aspect, a partition 402 including a sub-opening 404 may be provided in the recess 202. The partition may be located in the gap 400 to further separate and prevent the connectors of the plug 302 from activating the switch 210. The diameter or size of the sub-opening 404 may be further configured such that switch 210 is not visible or at least not easily discernible upon bare examination of the recess 202 of the integrated port 110. For example, the diameter of the sub-opening may be substantially smaller (e.g., less than or equal to 50%) than the diameter of the recess 202 of the integrated port, which may also restrict the manner and type of tool with which the switch 210 may be activated in the absence of plug 302 from the recess.

Figure 5:
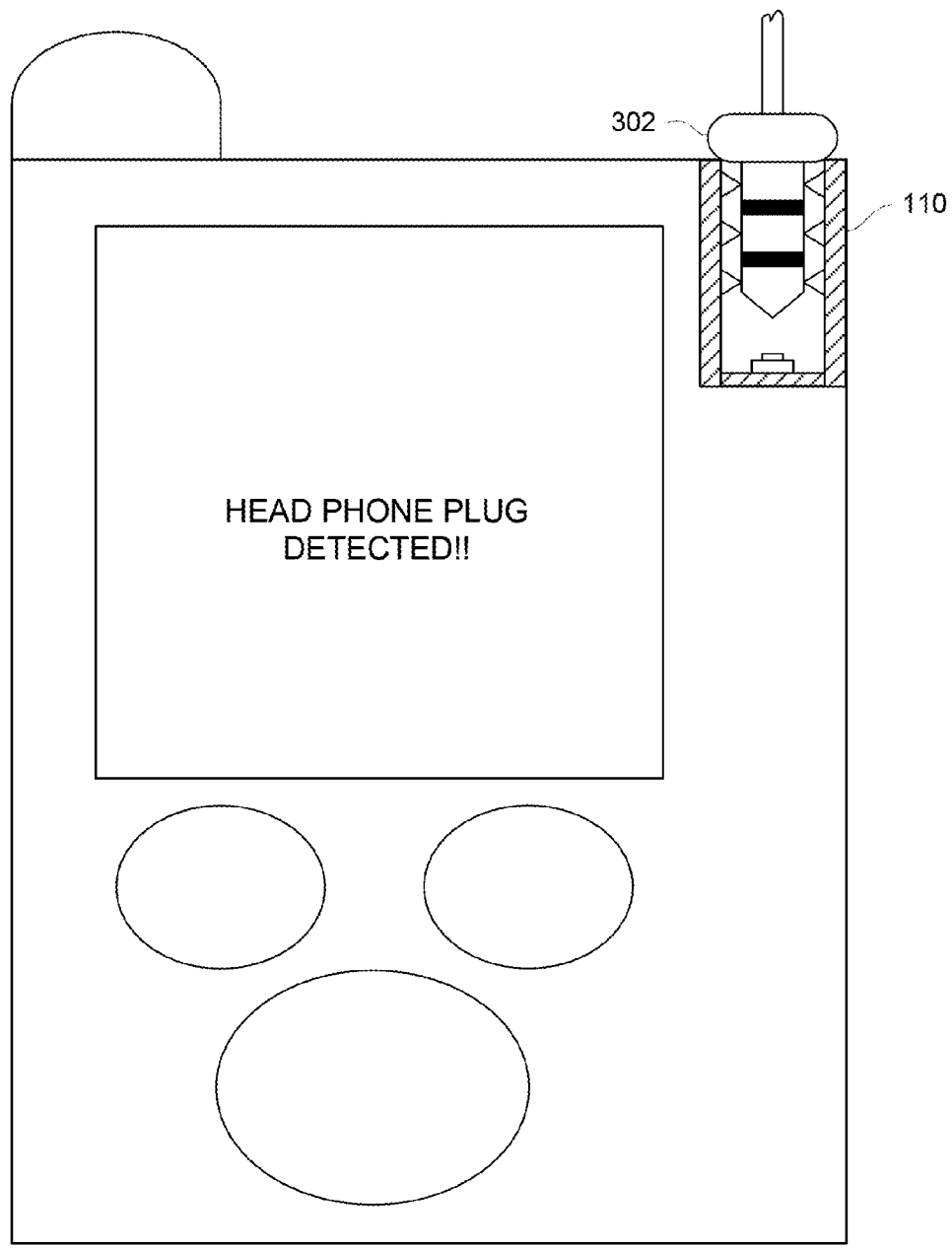
FIGS. 5-6 illustrate an operation of the device in accordance with various aspects of the disclosure.

The processor 102 of the device 100 may be configured to operate in different modes depending upon whether a detection result indicates that a plug 302 has been inserted into the integrated port 110 (first operational mode) or that the switch 210 has been activated using an appropriate tool other than the plug 302 (second operational mode). As shown in FIG. 5, for example, upon detecting the insertion of the plug 302 into the port 110 (e.g., by sensing a change in the current, potential, or resistance at one or more of the terminals 204, 206 and 208 which engage with respective connectors of the plug 302), the processor 102 may provide a message on the display 106 indicating that a headphone has been detected by the device and accordingly function in the first mode of operation. Upon detection of the headphone plug, for example, audio data selected by a user may be output by the processor in the first mode of operation via the terminals of the integrated port 110 to one or more external speakers of the headphone instead of a speaker(s) built into the device.

Figure 6:
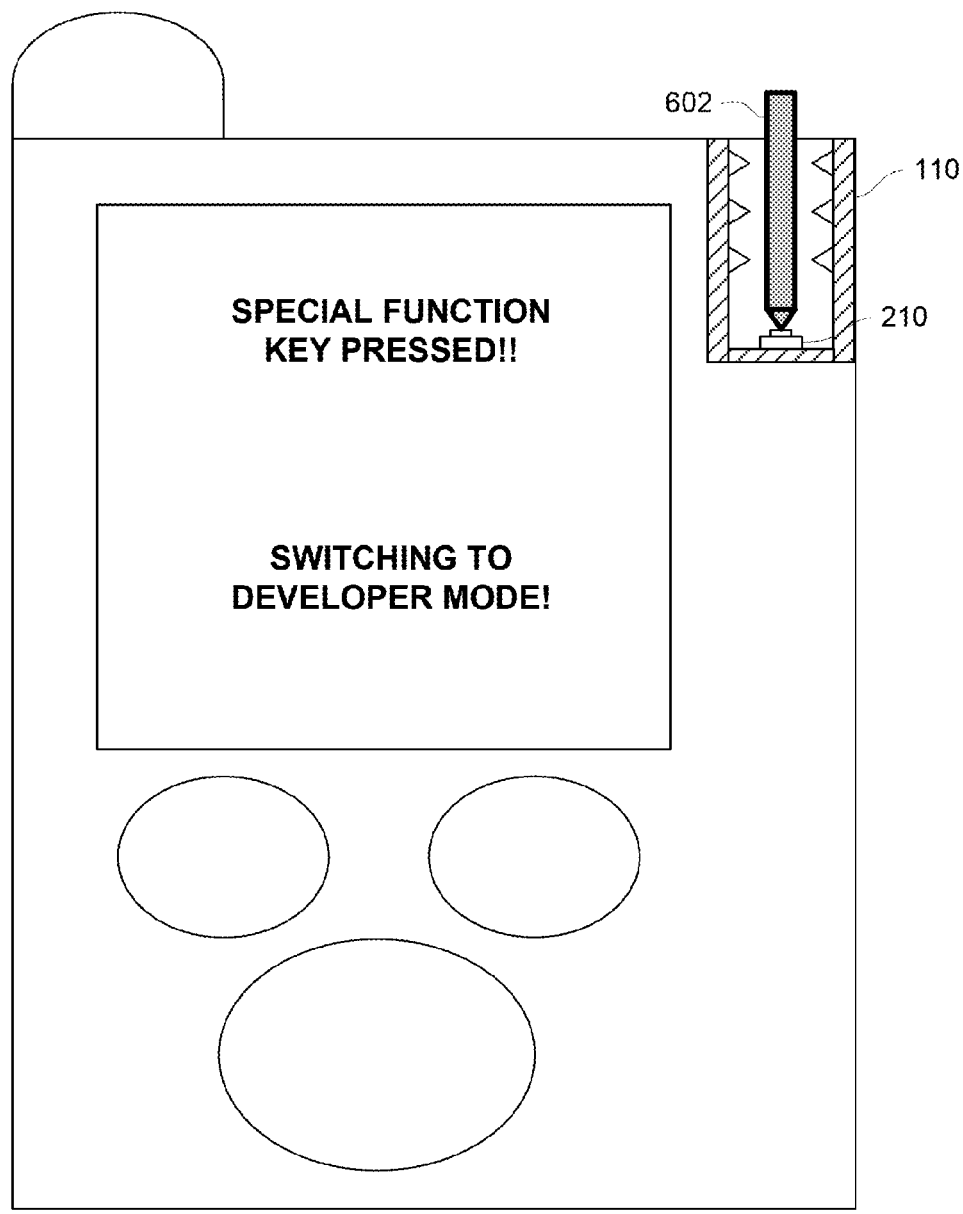

Alternatively, and as shown in FIG. 6, the processor 102 may detect that the switch 210 has been activated via mechanical pressure applied using an appropriate tool (other than the plug 302 which engages with the terminals of the integrated port and results in detection of the plug) and may take appropriate action in response to the activation of the switch by switching from the first mode of operation into a second mode of operation. The tool may be any implement (e.g., a narrow elongated pin) that may be inserted into the recess 202 to activate the switch 210, and which does not electrically engage with the terminals provided in the integrated port. As described above, the second mode of operation may be a special mode of operation not intended for general users, such as a test mode, a developer mode, a reset mode, etc.

While switch 210 has been illustrated as a mechanical switch, the disclosure is not so limited. In other aspects, the switch 210 may also implemented, for example, as an optical or solid state switch. In yet other aspects, the switch 210 may also be implemented, not as a switch per se, but as a sub-port having a number of sub-connectors (different from the terminals) for receiving and transmitting data to other devices. The sub-port may be activated upon insertion of a sub-connector into the sub-port, and, as before, the integrated port 110 may be configured such that insertion of the plug 302 that engages the terminals 204, 206, and 208 of the integrated port does not result in the activation of sub-port.

As mentioned above, while the integrated port 110 has been illustrated in the embodiments above as including a three terminal jack for connecting with a three-connector headphone plug, the disclosure is not so limited. In other embodiments, the opening forming the integrated port may include greater or lesser number of terminals for engaging other types of plugs, such as four-pin headphone plugs that include a microphone pin connected to an external microphone accessory.

In addition, the type of the integrated port 110 is also not limited. For example, it is contemplated that switch 210 may be integrated into openings forming other types of input/output ports such as Universal Serial Bus (USB) ports, device charger ports, communication jacks (e.g., RJ-11 or RJ-45 ports), external antennal ports, etc. In all cases, the processor 102 may distinguish between normal usage of the integrated port using a connector that connects with one or more terminals of the port, versus when the switch, which may be located proximate to yet separate from the terminals, is activated using an appropriate tool other than the particular connector that engages the terminals of the integrated port.

The aspects disclosed above have a number of advantages. For example, eliminating the need for a separate opening helps reduce the number of openings provided on consumer devices such as smart-phones or tablets, which is an important factor in the aesthetic look of the device. Furthermore, special functions of the device may be more easily invoked without requiring a removal of a portion of the body of the device. Yet further, a mechanism for activating the special function(s) may be integrated into an existing opening forming an input/output port of the device, such that the mechanism cannot be easily detected or accidentally activated by a consumer during normal operation of the device.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Furthermore, while particular processes are shown in a specific order in the appended drawings, such processes are not limited to any particular order unless such order is expressly set forth herein.

The invention claimed is:

1. A port of a user device to operate the user device in one or more selected modes of operation, the port comprising:
   a body defining an opening to a recess for receiving one or more connectors of a plug;
   one or more terminals exposed in the recess for electrically coupling with the one or more connectors of the plug in a first mode of operation; and,
   a switch disposed in the recess remote and distal from the opening, activation of the switch causing the user device to operate in a second mode of operation;
   wherein, upon full insertion of the plug into the recess via the opening electrically coupling the one or more terminals of the port with the one or more connectors of the plug, there is a physical gap between the distally disposed switch and the one or more connectors of the plug that are electrically coupled with the one or more terminals of the port such that the switch is not activatable by the plug.

2. The port of claim 1, wherein the switch is a mechanical switch.

3. The port of claim 1, wherein the port is an audio port for transmitting audio data from the user device or receiving audio data in the user device via at least one of the terminals of the port electrically coupled with at least one of the connectors of the plug in the first mode of operation.

4. The port of claim 1, wherein the one or more terminals of the port are located proximal to the opening providing access to the recess.

5. The port of claim 1, further comprising a partition having an sub-opening, the partition being disposed at a location in the recess between the switch and the one or more connectors of the plug that are electrically coupled with the one or more connectors of the plug and preventing the plug from activating the switch.

6. The port of claim 1, wherein the switch, when activated, changes the operational state of the user device from the first mode of operation to the second mode of operation.

7. A port of a user device to operate the user device in one or more selected modes of operation, the port comprising:

a body defining an opening to a recess for receiving one or more connectors of a plug;

one or more terminals exposed in the recess for electrically coupling with the one or more connectors of the plug in a first mode of operation; and, a switch disposed in the recess remote from the opening, activation of the switch changing the operational state of the user device from the first mode of operation to the second mode of operation;

wherein:

insertion of the plug into the recess via the opening electrically couples the one or more terminals of the port with the one or more connectors of the plug without activating the switch, and the switch is activated by receiving a tool, different from the plug, into the recess of the port via the opening without electrically coupling with any of the one or more terminals exposed in the recess of the port.

8. A device comprising:

a memory storing instructions and data; and, a processor configured to execute the instructions and to process the data; and a communication port defining an opening to a recess for receiving one or more connectors of a plug of an accessory of the device;

wherein the communication port includes a switch disposed in the recess remote and distal from the opening, and one or more terminals for electrically coupling with the one or more connectors of the plug in a first mode of operation, activation of the switch causing the device to operate in a second mode of operation;

wherein upon full insertion of the plug of the accessory into the recess of the communication port electrically coupling the one or more terminals of the port with the one or more connectors of the plug for communication between the device and the accessory without activating the switch, there is a physical gap between the distally disposed switch and the one or more connectors of the plug that are electrically coupled with the one or more terminals of the port such that the switch is not activatable by the plug.

9. The device of claim 8, wherein the processor is configured to detect an activation of the switch and, in response to the activation of the switch, change an operational state of the device from the first mode of operation to the second mode of operation.

10. A device comprising:

a memory storing instructions and data; and, a processor configured to execute the instructions and to process the data; and a communication port defining an opening to a recess for receiving one or more connectors of a plug of an accessory of the device;

wherein the communication port includes a switch and one or more terminals for electrically coupling with the one or more connectors of the plug in a first mode of operation, activation of the switch causing the device to operate in a second mode of operation;

wherein insertion of the plug of the accessory into the recess of the communication port electrically couples the one or more terminals of the port with the one or more connectors of the plug for communication between the device and the accessory without activating the switch;

wherein the processor is configured to detect an activation of the switch and, in response to the activation of the switch, change an operational state of the device from the first mode of operation to the second mode of operation; and wherein the switch is configured to be activated via insertion of a tool, different from the plug, into the recess of the port without electrically coupling with any of the one or more terminals exposed in the recess of the port.

11. The device of claim 9, wherein the processor is further configured to:

detect insertion of the plug of the accessory into the communication port by sensing a change in an electrical potential, current, or resistance in at least one of the terminals of the port that is electrically coupled with at least one of the connectors of the plug.

12. The device of claim 11, wherein, upon detecting the insertion of the plug of the accessory into the communication port, the processor is further configured to:

transmit the data to the accessory or receive the data from the accessory via at least one of the terminals of the port electrically coupled with at least one of the connectors of the plug.

13. The device of claim 8, wherein the communication port is an audio port.

14. The device of claim 8, wherein the switch is a mechanical switch.

15. The device of claim 8, wherein the device is a phone, a tablet, a personal digital assistant, a laptop, or a personal computer.

16. The device of claim 8, wherein the device is a portable handheld device.

17. A method for operating a device in one or more selected modes of operation, the method comprising:

providing a port having an opening for receiving one or more connectors of a plug, the opening providing access to a recess within the port;

exposing one or more terminals in the recess for electrically coupling with the one or more connectors of the plug in a first mode of operation;

disposing a switch in the recess remote from the opening, activation of the switch changing an operational state of the device from the first mode of operation to a second mode of operation upon activation of the switch; and receiving a tool, different from the plug, into the recess of the port for activation of the switch, insertion of the tool resulting in activation of the switch without electrically coupling the tool with any of the one or more terminals exposed in the recess of the port;

wherein, insertion of the plug into the recess via the opening electrically couples the one or more terminals of the port with the one or more connectors of the plug without activating the switch.

18. The method of claim 17, the method further comprising transmitting audio data from the device or receiving audio data in the device via at least one of the terminals of the port electrically coupled with at least one of the connectors of the plug in the first mode of operation.

19. The method of claim 17, the method further comprising:

locating the one or more terminals of the port proximal to the opening providing access to the recess, and, locating the switch distal to the opening such that insertion of the plug into the recess results in a physical gap between the switch and the one or more connectors of the plug that are electrically coupled with the one or more terminals of the port.

20. The method of claim 17, the method further comprising:

disposing a partition having an sub-opening at a location in the recess between the switch and the one or more connectors of the plug that are electrically coupled with the one or more connectors of the plug.

* * * * *